(12) United States Patent
Bennett (10) Patent No.: US 7,904,599 B1
(45) Date of Patent: Mar. 8, 2011

(54) SYNCHRONIZATION AND AUDITING OF ZONE CONFIGURATION DATA IN STORAGE-AREA NETWORKS

(75) Inventor: Steven James Bennett, Maple Grove, MN (US)

(73) Assignee: Cisco Technology, Inc., San Jose, CA (US)

( * ) Notice: Subject to any disclaimer, the term of this patent is extended or adjusted under 35 U.S.C. 154(b) by 1384 days.

(21) Appl. No.: 10/402,199

(22) Filed: Mar. 28, 2003

(51) Int. Cl.
*G06F 15/16* (2006.01)

(52) U.S. Cl. ......................... 709/249; 709/232; 709/246

(58) Field of Classification Search .................. 709/249, 709/232, 246
See application file for complete search history.

(56) References Cited

U.S. PATENT DOCUMENTS

| | | | |
|---|---|---|---|
| 4,495,617 A | 1/1985 | Ampulski et al. |
| 5,390,326 A | 2/1995 | Shah |
| 5,461,608 A | 10/1995 | Yoshiyama |
| 5,473,599 A | 12/1995 | Li et al. |
| 5,535,395 A | 7/1996 | Tipley et al. |
| 5,544,077 A | 8/1996 | Hershey |
| 5,579,491 A | 11/1996 | Jeffries et al. |
| 5,600,828 A | 2/1997 | Johnson et al. |
| 5,666,486 A | 9/1997 | Alfieri et al. |
| 5,732,206 A | 3/1998 | Mendel |
| 5,812,821 A | 9/1998 | Sugi et al. |
| 5,832,299 A | 11/1998 | Wooten |
| 5,850,573 A | 12/1998 | Wada |
| 5,870,571 A | 2/1999 | Duburcq et al. |
| 5,909,544 A | 6/1999 | Anderson et al. |
| 5,951,683 A | 9/1999 | Yuuki et al. |
| 5,991,813 A | 11/1999 | Zarrow |
| 5,996,024 A | 11/1999 | Blumenau |
| 5,996,027 A | 11/1999 | Volk et al. |
| 6,006,259 A | 12/1999 | Adelman et al. |
| 6,009,476 A | 12/1999 | Flory et al. |
| 6,009,480 A | 12/1999 | Pleso |
| 6,018,765 A | 1/2000 | Durana et al. |
| 6,041,381 A | 3/2000 | Hoese |
| 6,078,957 A | 6/2000 | Adelman et al. |
| 6,108,300 A | 8/2000 | Coile et al. |
| 6,108,699 A | 8/2000 | Moiin |
| 6,131,119 A | 10/2000 | Fukui |
| 6,134,673 A | 10/2000 | Chrabaszcz |
| 6,145,019 A | 11/2000 | Firooz et al. |
| 6,163,855 A | 12/2000 | Shrivastava et al. |

(Continued)

OTHER PUBLICATIONS

*VMware ESX Server: User's Manual, Version 1.0*, [on-line]. [archived on Jun. 8, 2001]. Retrieved from the Internet: <http://web.archive.org/web/20010608201203/www.vmware.com/support>, 122-124.

(Continued)

*Primary Examiner* — John Follansbee
*Assistant Examiner* — Nghi V Tran
(74) *Attorney, Agent, or Firm* — Schwegman, Lundberg & Woessner, P.A.

(57) ABSTRACT

Many storage-area networks (SANs) are structured so that an end-user or client-computer can access data on one or more target storage devices through a storage router and a separate Fiber Channel (FC) switch. However, the conventional use of a separate FC switch to couple the storage router makes it difficult and time consuming to restore zone configuration of the FC switch. Accordingly, the present inventor devised, among other things, an exemplary method of automatically maintaining and synchronizing a copy of zone configuration data for an FC switch. Through these and/or other features, the exemplary embodiment ultimately reduces the cost and complexities associated with implementing storage-area networks.

20 Claims, 5 Drawing Sheets

U.S. PATENT DOCUMENTS

| | | | |
|---|---|---|---|
| 6,178,445 B1 | 1/2001 | Dawkins et al. | |
| 6,185,620 B1 | 2/2001 | Weber et al. | |
| 6,195,687 B1 | 2/2001 | Greaves et al. | |
| 6,195,760 B1 | 2/2001 | Chung et al. | |
| 6,209,023 B1 | 3/2001 | Dimitroff et al. | |
| 6,219,771 B1 | 4/2001 | Kikuchi et al. | |
| 6,268,924 B1 | 7/2001 | Koppolu et al. | |
| 6,269,396 B1 | 7/2001 | Shah et al. | |
| 6,314,526 B1 | 11/2001 | Arendt et al. | |
| 6,343,320 B1 | 1/2002 | Fairchild et al. | |
| 6,363,416 B1 | 3/2002 | Naeimi et al. | |
| 6,378,025 B1 | 4/2002 | Getty | |
| 6,393,583 B1 | 5/2002 | Meth et al. | |
| 6,400,730 B1 | 6/2002 | Latif et al. | |
| 6,449,652 B1 | 9/2002 | Blumenau et al. | |
| 6,470,382 B1 | 10/2002 | Wang et al. | |
| 6,470,397 B1 | 10/2002 | Shah et al. | |
| 6,473,803 B1 | 10/2002 | Stern et al. | |
| 6,480,901 B1 | 11/2002 | Weber et al. | |
| 6,484,245 B1 | 11/2002 | Sanada et al. | |
| 6,574,755 B1 | 6/2003 | Seon | |
| 6,591,310 B1 | 7/2003 | Johnson | |
| 6,597,956 B1 | 7/2003 | Aziz et al. | |
| 6,640,278 B1 | 10/2003 | Nolan et al. | |
| 6,654,830 B1 | 11/2003 | Taylor et al. | |
| 6,658,459 B1 | 12/2003 | Kwan et al. | |
| 6,678,721 B1 | 1/2004 | Bell | |
| 6,683,883 B1* | 1/2004 | Czeiger et al. | 370/401 |
| 6,691,244 B1 | 2/2004 | Kampe et al. | |
| 6,697,924 B2 | 2/2004 | Swank | |
| 6,701,449 B1 | 3/2004 | Davis et al. | |
| 6,718,361 B1 | 4/2004 | Basani et al. | |
| 6,721,907 B2 | 4/2004 | Earl | |
| 6,724,757 B1 | 4/2004 | Zadikian et al. | |
| 6,738,854 B2 | 5/2004 | Hoese et al. | |
| 6,748,550 B2 | 6/2004 | McBrearty et al. | |
| 6,757,291 B1 | 6/2004 | Hu | |
| 6,760,783 B1 | 7/2004 | Berry | |
| 6,763,195 B1 | 7/2004 | Willebrand et al. | |
| 6,763,419 B2 | 7/2004 | Hoese et al. | |
| 6,766,520 B1 | 7/2004 | Rieschl et al. | |
| 6,771,663 B1 | 8/2004 | Jha | |
| 6,771,673 B1 | 8/2004 | Baum et al. | |
| 6,799,316 B1 | 9/2004 | Aguilar et al. | |
| 6,807,581 B1 | 10/2004 | Starr et al. | |
| 6,823,418 B2 | 11/2004 | Langendorf et al. | |
| 6,856,591 B1 | 2/2005 | Ma et al. | |
| 6,859,462 B1 | 2/2005 | Mahoney et al. | |
| 6,877,044 B2 | 4/2005 | Lo et al. | |
| 6,886,171 B2 | 4/2005 | MacLeod | |
| 6,895,461 B1 | 5/2005 | Thompson | |
| 6,920,491 B2 | 7/2005 | Kim | |
| 6,938,092 B2 | 8/2005 | Burns | |
| 6,944,785 B2 | 9/2005 | Gadir et al. | |
| 6,980,525 B2* | 12/2005 | Banks et al. | 370/254 |
| 7,039,870 B2* | 5/2006 | Takaoka et al. | 715/736 |
| 7,433,300 B1 | 10/2008 | Bennett et al. | |
| 2002/0010750 A1 | 1/2002 | Baretzki | |
| 2002/0042693 A1 | 4/2002 | Kampe et al. | |
| 2002/0049845 A1 | 4/2002 | Sreenivasan et al. | |
| 2002/0055978 A1 | 5/2002 | Joon-Bo et al. | |
| 2002/0059392 A1 | 5/2002 | Ellis | |
| 2002/0065872 A1 | 5/2002 | Genske et al. | |
| 2002/0103943 A1 | 8/2002 | Lo et al. | |
| 2002/0116460 A1 | 8/2002 | Treister et al. | |
| 2002/0126680 A1 | 9/2002 | Inagaki et al. | |
| 2002/0156612 A1 | 10/2002 | Schulter et al. | |
| 2002/0188657 A1 | 12/2002 | Traversat et al. | |
| 2002/0188711 A1 | 12/2002 | Meyer et al. | |
| 2002/0194428 A1 | 12/2002 | Green | |
| 2003/0002492 A1 | 1/2003 | Gallagher | |
| 2003/0005068 A1 | 1/2003 | Nickel et al. | |
| 2003/0018756 A1* | 1/2003 | Nguyen et al. | 709/220 |
| 2003/0018813 A1 | 1/2003 | Antes et al. | |
| 2003/0018927 A1 | 1/2003 | Gadir et al. | |
| 2003/0058870 A1 | 3/2003 | Mizrachi et al. | |
| 2003/0084209 A1 | 5/2003 | Chadalapaka | |
| 2003/0097607 A1 | 5/2003 | Bessire | |
| 2003/0137941 A1* | 7/2003 | Kaushik et al. | 370/241 |
| 2003/0182455 A1 | 9/2003 | Hetzler et al. | |
| 2003/0208579 A1 | 11/2003 | Brady et al. | |
| 2003/0210686 A1 | 11/2003 | Terrell et al. | |
| 2003/0237016 A1 | 12/2003 | Johnson et al. | |
| 2004/0022256 A1* | 2/2004 | Green | 370/401 |
| 2004/0024778 A1 | 2/2004 | Cheo | |
| 2004/0064553 A1 | 4/2004 | Kjellberg | |
| 2004/0078599 A1* | 4/2004 | Nahum | 713/201 |
| 2004/0088508 A1* | 5/2004 | Ballard et al. | 711/162 |
| 2004/0141468 A1 | 7/2004 | Christensen | |
| 2004/0233910 A1 | 11/2004 | Chen et al. | |
| 2005/0038836 A1 | 2/2005 | Wang | |
| 2005/0055418 A1 | 3/2005 | Blanc et al. | |
| 2005/0063313 A1 | 3/2005 | Nanavati et al. | |
| 2005/0195736 A1 | 9/2005 | Matsuda | |
| 2005/0216788 A1* | 9/2005 | Mani-Meitav et al. | 714/6 |
| 2005/0262233 A1* | 11/2005 | Alon et al. | 709/223 |
| 2005/0268151 A1 | 12/2005 | Hunt et al. | |
| 2006/0117211 A1 | 6/2006 | Matsunami et al. | |
| 2006/0117212 A1 | 6/2006 | Meyer et al. | |
| 2006/0206494 A1* | 9/2006 | Ibrahim et al. | 707/10 |
| 2006/0265529 A1 | 11/2006 | Kuik et al. | |

OTHER PUBLICATIONS

Bakker, G., *IP Aliasing*, [on-line]. [retrieved on Jun. 8, 2005]. Retrieved from the Internet: <http://www.zone-h.org/files/24/ip_aliasing.txt>, 3 pgs.

Gusella, R., et al., "An Election Algorithm for a Distributed Clock Synchronization Program", *Report No. UCB/CSD 86/257*, University of California, Berkeley, (Dec. 1985), 1-17.

Gusella, R., et al., "The Berkeley UNIX® Time Synchronization Protocol", *UNIX Programmers Manual 4.3*, vol. 2C, Berkeley Software Distributing, (1986), 10 pgs.

Knight, S., et al., *Virtual Router Redundancy Protocol*, Network Working Group, RFC 2338 [on-line]. [retrieved on May 10, 2002]. Retrieved from the Internet: <http://www.search.ietf.org/rfc/rfc2338.txt>, 26 pgs.

Lewis, P., "A High-Availability Cluster for Linux", *Linux Journal*, 64, [on-line]. [retrieved on Oct. 25, 2001]. Retrieved from the Internet: <http://www2.linuxjournal.com/ lj-issues/issue64/3247.html>, 11 pgs.

Li, T., et al., *Cisco Hot Standby Router Protocol (HSRP)*, Network Working Group; RFC 2281, [on-line]. [retrieved on May 10, 2002]. Retrieved from the Internet: <http://www.search.ietf.org/rfc/rfc2281.txt>, 16 pgs.

Meth, K. Z., et al., "Design of the iSCSI Protocol", *Proceedings of the 20th IEEE/ 11th NASA Goddard Conference on Mass Storage Systems and Technologies (MSS'03)*, (2003), 116-122.

Moore, K., *On the Use of HTTP as a Substrate*, Network Working Group, RFC 3205, [on-line]. [retrieved on May 10, 2002]. Retrieved from the Internet: <http://www.search.ietf.org/rfc/rfc3205.txt>, 14 pgs.

Satran, J., et al., *iSCSI*, IPS Internet Draft, draft-ietf-ips-iSCSI-12.txt, Category: standards—track, (Apr. 17, 2002), 260 pgs.

Satran, J., et al., *iSCSI*, IPS Internet Draft, draft-ietf-ips-iSCSI-00, Category: Standards Track, [on-line]. [retrieved Mar. 2000]. Retrieved from the Internet: <http://www.haifa.il.ilb.com/satran/ips/draft-ietf-ips-iSCSI-00.txt>, 78 pgs.

Simitci, H., et al., "Evaluation of SCSP over TCP/IP and SCSI Over Fibre Channel Connections", *Hot Interconnects*, 9, (Aug. 2001), 87-91.

* cited by examiner

SYNCHRONIZATION AND AUDITING OF ZONE CONFIGURATION DATA IN STORAGE-AREA NETWORKS

TECHNICAL FIELD

Various embodiments of the present invention concern storage-area networks, especially storage routers and Fibre Channel switches suitable for such networks.

BACKGROUND

In recent years, the rapid growth of the Internet and other computer networks has fueled an equally fantastic growth in the use of computers as everyday communications devices for both individuals and businesses. Such widespread and growing use has led to the generation and accumulation of vast amounts of digital data. This, in turn, has spurred scientists and engineers to develop specialized subsystems, such as storage-area networks, for managing and storing data.

A storage-area network (SAN) is a high-speed subnetwork of shared data-storage devices, such as disk and tape drives. These networks are particularly advantageous not only because they spare other servers in a larger network, such as corporate intranet, from the burden of storing and managing large amounts of data, and thus allow use of these servers for other higher priority uses, but also because they facilitate data consolidation, which allows users to exploit economies of scale. Moreover, a group of storage devices can be logically partitioned into private storage areas, called zones, with the access to each zone restricted to certain users or computer systems.

Some storage-area networks (SANs) are structured so that an end-user or client-computer can access data on one or more target storage devices through a storage router and a separate Fibre Channel switch. (Fibre Channel generally refers to a serial data-transfer architecture and communications standard developed by a consortium of computer and storage-device manufacturers for use with high-speed mass-storage devices and other peripherals, particularly via optical fiber interconnects.) The Fibre Channel (FC) switch converts data received from the storage router to a Fibre Channel-compliant protocol, such as FC-AL (Fibre Channel Arbitrated Loop) standard, and directs the converted data via high-speed electrical or optical fiber lines to the proper target devices.

However, the present inventor has recognized that conventional storage-area networks, such as those that use separate FC switches and storage routers, present increased complexities and costs related to maintaining and restoring a zoning configuration. For example, administrators of these networks may be forced to manually and separately reconfigure the zoning defined in a FC switch in the event of a system failure. This can be problematic because the zoning configuration may be configured by different entities independently of the administrator, making it even more difficult, time-consuming, and costly to perform the restoration.

Accordingly, the present inventor has recognized a need to reduce the cost and complexities associated with maintaining storage-area networks, particularly restoring zoning configurations.

SUMMARY

To address this and other needs, the present inventor devised methods, software, and related devices and systems that automatically maintain and synchronize a copy of a zone configuration for at least one FC switch in another device, such an iSCSI storage router, to facilitate restoration of the zone configuration. In one embodiment, the FC switch is integrated onto a common circuit board with the iSCSI storage router. Through these and other features, the exemplary embodiment ultimately reduces the cost and complexities associated with maintaining storage-area networks.

DETAILED DESCRIPTION OF EXEMPLARY EMBODIMENTS

This description, which references and incorporates the above-identified figures and the appended claims, describes one or more specific embodiments of one or more inventions. These embodiments, offered not to limit but only to exemplify and teach the one or more inventions, are shown and described in sufficient detail to enable those skilled in the art to implement or practice the invention. Thus, where appropriate to avoid obscuring the invention, the description may omit certain information known to those of skill in the art.

Figure 1:
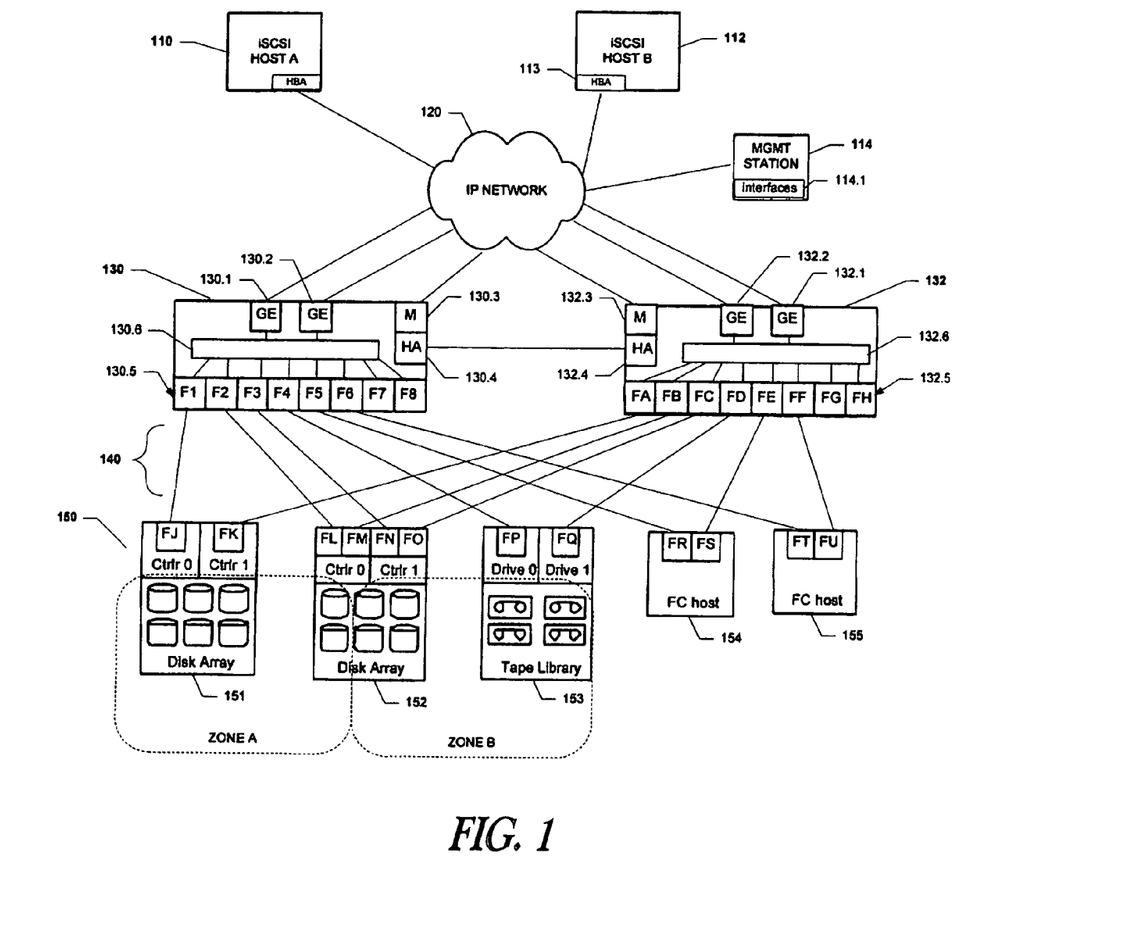
FIG. 1 is a block diagram of an exemplary system 100 corresponding to one or more embodiments of the present invention.

FIG. 1 shows an exemplary computer system 100 which incorporates teachings of the present invention. System 100 includes iSCSI-compliant hosts 110 and 112, a management station 114, an IP network 120, integrated storage router-switches 130 and 132, Fibre Channel-compliant communications channels 140, and Fibre Channel (FC) hosts and devices 150.

iSCSI-compliant hosts 110 and 112, which take the exemplary forms of servers or other computer systems, and are substantially identical in this embodiment, include respective features such as displays, user interfaces, processors, memories, operating systems, and host bus adapters.

The exemplary host bus adapters comply with a version of the Internet Small Computer System Interface (iSCSI) protocol for storage of data over an IP network. The host bus adapters facilitate encapsulation and communication of Small Computer System Interface (SCSI) input-output commands using an Internet Protocol, such as TCP/IP. In the exemplary embodiment, each host bus adapter includes a network interface card or a Gibabit Ethernet server card, which includes a Gigabit Ethernet driver. Other embodiments use any IP-capable interfaces, for example, 10/100 Ethernet, wireless local-area network (LAN), Asynchronous Transfer Mode (ATM), etc. In some embodiments, the host bus adapters are virtual in the sense that iSCSI drivers are provided to effectively enable non-iSCSI network interface cards to function as iSCSI-compliant devices. For details regarding a virtual host bus adapter and related software modules, see copending and co-owned U.S. patent application Ser. No. 10/143,561 entitled System, Method, and Software for Target ID Binding in a Storage-area Network and U.S. patent application Ser. No. 10/143,456 entitled System, Method, and Software for a Virtual Host Bus Adapter in a Storage-area Network. Both of these applications were filed on May 9, 2002 and are incorporated herein by reference Management station 114 includes user interfaces 114.1, such as a graphical-user interface and/or a command-line interface (neither shown separately), that facilitate monitoring, configuring, and control of router-switches 130 and 132.

Integrated storage router-switches 130 and 132, which communicate with hosts 110 and 112 and management station 114 via IP network 120, are substantially identical in the exemplary embodiment. Router-switch 130 includes GE ports 130.1 and 130.2, a management (M) port 130.3, a high-availability (HA) port 130.4, and a FC port set 130.5. Router-switch 132 similarly includes GE ports 132.1 and 132.2, a management (M) port 132.3, a high-availability (HA) port 132.4, and a FC port set 132.5.

More particularly, GE ports 130.1, 130.2, 132.1 and 132.2 are coupled to IP network 120. M ports 130.3 and 132.3 are coupled to each other, and HA ports 130.4 and 132.4 are also coupled to each other.

FC port set 130.5 include ports F1-F8, which are operatively coupled via router-switch interface 130.6 to GE ports 130.1 and/or 130.2. FC port set 132.5 includes optical ports FA-FH, which are operatively coupled via router-switch interface 132.6 to GE ports 132.1 and/or 132.2.

In the exemplary embodiment, all the Fibre-Channel ports are general ports, which can function as fabric, fabric-looped, or N ports. Router-switch interface 130.6 includes software for making GE ports 132.1 and 132.2 and FC port set 130.5 appear to hosts 110 and 112 as a single integrated device. FC ports in port sets 130.5 and 132.5 are coupled via FC-compliant communication channels 140, for example, optical fiber cables, to FC hosts and devices 150. In the exemplary embodiment, router-switches 130 and 132 conform to a version of the Fibre Channel standard, such as FC-AL standard.

FC hosts and devices 150, which together with router-switches 130 and 132 and channels 140 constitute a FC-compliant storage-area network, includes disk arrays 151 and 152, a tape library 153, and FC hosts 154 and 155. Disk array 151 is accessible via FC ports FJ and FK, which are coupled respectively to ports F1 and FA of router-switches 130 and 132. Disk array 152 is accessible via FC ports FL, FM, FN, FO, which are coupled respectively to ports F2, FB, F3, and FC. (Disk arrays 151 and 152 are RAIDs (Redundant Array of Independent (or Inexpensive) Disks) or JBODs (Just a Bunch of Disks.) Tape library 153 is accessible via FC ports FP and FQ, which are coupled respectively to ports F4 and FD. Each of the target storage devices has an associated logical unit number (not shown.)

FC host 154 includes FC ports FR and FS, which are coupled respectively to port F5 and FE. And, FC host 155 includes FC ports FT and FU, with port FT coupled to port F6 of switch-router 130 and port FU coupled to port FF of switch-router 132. FC hosts 154 and 155 can access disk arrays 151 and 152 and a tape library 153 through router-switch 130 and/or 132. In the exemplary embodiment, the storage devices are logically organized into one or more zone, such as zones A and B, with components within zone A accessible by iSCSI-compliant host 110 and components within zone B accessible by iSCSI-compliant host 112. As described in further detail below, the router-switches each maintain one or more sets of zone configuration data (not shown in this figure), which are subject to modification by authorized modifiers, such as management station 114, iSCSI-compliant hosts 110, 112, and/or FC hosts 154, 155.

Operation of the router-switch includes system initialization. In the exemplary embodiment, system initialization includes executing start-up diagnostics, starting and initializing applications, initializing the switch, and verifying switch operation. The initialization of the switch and the router portion are synchronized so that the entire system is made operational in a controlled fashion.

After initialization, host 110 or 112 accesses one or more of target storage devices 151, 152, and/or 153 through its operating system. The operating system forwards a block-level input-output command through the respective HBA, which in turn communicates the command and any associated data in an appropriate format (with target and LUN addresses or names) through a TCP/IP socket and IP network 120 to one of GE ports 130.1, 130.2, 132.1 and 132.2. The router portion of switch-router 130 or 132 strips off the TCP/IP and iSCSI headers, maps the logical iSCSI targets to SCSI addresses, adds FC and FCP headers, and routes the logical command and data onto the switch portion that includes FC port set 130.5 (or 132.5). The switch portion then transfers the logical command and data via one of its FC ports and a Fibre Channel link to one or more of FC hosts and devices 150 based on the SCSI addresses.

In response to the command and any associated data, the appropriate target storage device communicates data and/or status information through the appropriate channel and through one of the FC ports of switch-routers 130 and 132. The receiving switch-router formats the data and status according to the iSCSI and TCP/IP protocols and transmits across an IP network to the host bus adapter of the iSCSI host (110 or 112) that initiated the input-output command.

Figure 2A:
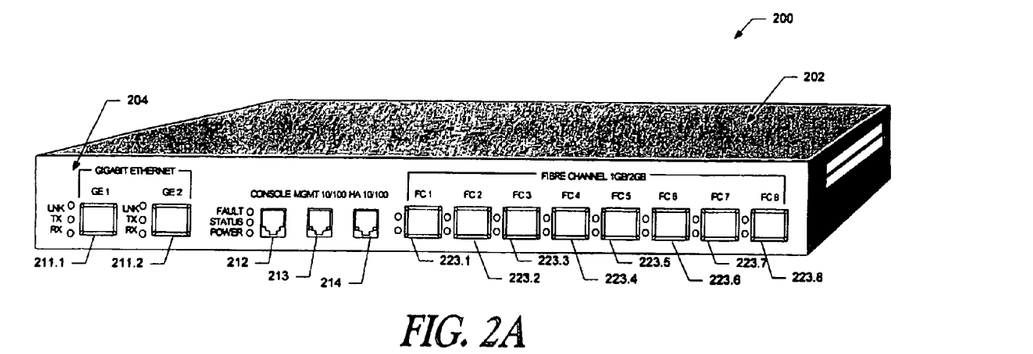
FIG. 2A is a prospective view of an exemplary integrated storage router-switch 200 corresponding to one or more embodiments of the present invention.
Figure 2B:
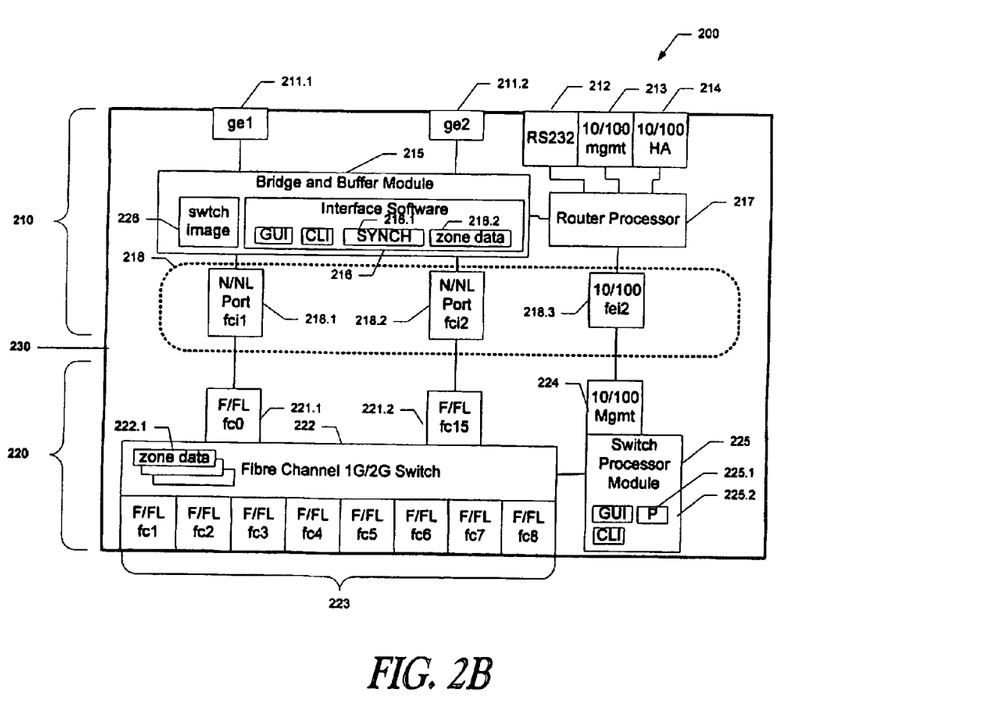
FIG. 2B is a block diagram showing further details of the integrated storage router-switch 200 and corresponding to one or more embodiments of the present invention.

FIGS. 2A and 2B shows details of an exemplary storage router-switch 200 which may be substituted for one or both of the integrated router-switches in FIG. 1.

FIG. 2A, a perspective view of router-switch 200, shows its 1U rack-mountable chassis or case 202, which includes a front panel 204. Front panel 204 includes GE port connectors 211.1 and 211.2, a console-port connector 212, a management-port connector 213, an HA-port connector 214, and FC port connectors (interfaces) 223.1-223.8. Each FC port has two associated LEDs (Light Emitting Diodes): one indicates whether the port is active and the other indicates whether the port is faulty. In the exemplary embodiment, each of connectors 212, 213, and 214 is a female RJ-45 (registered-jack 45) connector, and FC port connectors 223.1-223.8 take the form of female LC, MU, MTP, or MTRJ connectors. Other embodiments, however, use other types of connectors.

FIG. 2B, a block diagram, shows that router-switch 200 includes a router portion 210 and a switch portion 220 on a common motherboard 230. The motherboard is powered by a power supply (not shown) and cooled by common cooling system, such as a fan (also not shown).

Router portion 210 includes GE ports 211.1 and 211.2, console port 212, management port 213, high-availability (HA) port 214, bridge-and-buffer module 215, software 216, router processor 217, and router-to-switch interface 218. In the exemplary embodiment, router portion 210 complies with a version of the iSCSI protocol, such as draft 08 or later, and incorporates commercially available router technology, such as the 5420 Storage Router from Cisco System, Inc. of San Jose, Calif.

More particularly, GE ports 211.1 and 211.2 couple the router switch to an IP network for access by one or more servers or other computers, such as servers or iSCSI hosts (in FIG. 1). In some embodiments, GE ports 211.1 and 211.2 have respective MAC (Media Access Control) addresses, which are determined according to: base MAC address for the switch-router plus 31 minus the respective port number. (Two Gigabit Ethernet interfaces are available. Each ScsiRouter supports one or more IP addresses. The ScsiRouter IP address may be tied to any VLAN (virtual local-area network) on either GE interface.)

Console port 212 couples to a local control console (not shown). In the exemplary embodiment, this port takes the form of an RS-232 interface.

Management port 213 provides a connection for managing and/or configuring router-switch 110. In the exemplary embodiment, this port takes the form of a 10/100 Ethernet port and is assigned the base MAC address for the router-switch. As such, this port communicates via an IP protocol, for example, TCP/IP.

HA port 214 provides a physical connection for high-availability communication with another router-switch. In the exemplary embodiment, this port takes the form of a 10/100 Ethernet port, and is assigned the base MAC address plus 1. A failover occurs in the exemplary embodiment when: all devices used by the router-switch are inaccessible; the GE port used by the router-switch fails; router-to-switch interface 218 fails; or a switch failure is detected. A switch failure may cause the entire system, that is, the router-switch, to reboot.

Bridge-and-buffer module 215, which is coupled to GE ports 211.1 and 211.2, provides SCSI router services which are compliant with a version of the iSCSI protocol. In the exemplary embodiment, module 215 incorporates a Peripheral Component Interface (PCI) bridge, such as the Galileo GT64260 from Marvell Semiconductor, Inc., of Sunnyvale, Calif. Also module 215 includes a 64-megabyte flash file system, a 1-megabyte boot flash, and a 256-megabyte non-volatile FLASH memory (not shown separately.) In addition to data and other software used for conventional router operations, module 215, in this exemplary embodiment, includes router-switch interface software 216.

Software 216 performs iSCSI routing between servers and the storage devices. In the exemplary embodiment, the software includes not only an integrated router-switch command-line-interface module CLI and a web-based graphical-user-interface module GUI which facilitate operation, configuration, administration, maintenance, and support of the router-switch. Both the command-line interface and the graphical user interface are accessible from a terminal via one or both of the ports 212 and 213.

Additionally, software 216 includes a synchronization module 216.1 which maintains one or more backup copies of zone configuration for the FC switch, detects zone configuration changes, and updates or synchronizes one or more of the backup copies of the zone configuration data, such as backup zone data 216.2. In the exemplary embodiment, backup zone data 216.2 takes the form of XML files in a backup-zone directory structure and includes zone configuration data that specifically concerns switch portion 220 and that is defined or modified through one or more of ports 211.1, 211.2, 212, and 213 (non-storage-side ports). However, in other embodiments, the backup zone data includes zone configuration data for one or more FC switches other than that in switch portion 220 and/or zone configuration data that is defined or modified through one or more non-storage-side ports, but also through one or more storage-side ports, such as the FC ports. Examples of zone configuration data include zone, zoneset, and alias listings or definitions. Generally, a zone definition generally includes ports, FC addresses, device WWN, and aliases; a zoneset includes a listing of zones; and an alias is a convenient grouping of ports, FC addresses, and device WWN. However, some embodiments may restrict the items that may be used or included within a zone, zoneset, or alias. For example, one embodiment may prevent use of FC addresses or ports in an alias or zone definition.

Various embodiments may store the backup zone data in any convenient storage device or location, including, for example, in a volatile or non-volatile memory on router portion 210 or in a non-volatile memory on a management station, such as management station 114 in FIG. 1. The command-line-interface module and the graphical-user-interface module include command features (not shown) which allow a user to save a zone configuration of the switch-router to a persistent memory inside or outside the switch-router, or to restore the zone configuration for the switch-router based on the all or a portion of the backup zone data. Further details regarding exemplary operation and architecture of synchronization module 216 are described in a separate section below.

Router Processor 217, in the exemplary embodiment, is implemented as a 533-MHz MPC7410 PowerPC from Motorola, Inc. of Schaumburg, Ill. This processor includes 1-megabyte local L2 cache (not shown separately). In the exemplary embodiment, router processor 217 runs a version of the VX Works operating system from WindRiver Systems, Inc. of Alameda, Calif. To support this operating system, the exemplary embodiment also provides means for isolating file allocations tables from other high-use memory areas (such as areas where log and configuration files are written).

Coupled to router processor 217 as well as to bridge-and-buffer module 215 is router-to-switch (RTS) interface 218. RTS interface 218 includes N/NL switch-interface ports 218.1 and 218.2 and management-interface port 218.3.

Switch-interface ports 218.1 and 218.2 are internal FC interfaces through which the router portion conducts input-output (I/O) operations with the switch portion. When a mapping to a FC storage device is created, the router-switch software automatically selects one of the switch-interface port to use when accessing the target device. The internal interfaces are selected at random and evenly on a per-LUN (logical unit number) basis, allowing the router-switch to load-balance between the two FC interfaces. The operational status of these internal FC interfaces is monitored by each active SCSI Router application running on the switch-router. The failure of either of these two interfaces is considered a unit failure, and if the switch-router is part of a cluster, all active SCSI Router applications will fail over to another switch-router in the cluster. Other embodiments allow operations to continue with the remaining switch-interface port. Still other embodiments include more than two switch-interface ports with various allocation algorithms.

In the exemplary embodiment, the N/NL switch-interface ports can each use up to 32 World Wide Port Names (WWPNs). The WWPNs for port 218.1 are computed as 28+virtual port+base MAC address, and the WWPNs for port 218.2 are computed as 29+virtual port+base MAC address. Additionally, management of switch-interface ports 218.1 and 218.2 is hidden from the user. One exception is the WWPN of each internal port. The internal WWPNs are called "initiator" WWPNs. Users who set up access control by WWPN on their FC devices set up the device to allow access to both switch-router initiator WWPNs.

Switch-interface port 218.3 is used to exchange configuration data and get operational information from switch portion 220 through its management-interface port 224. In the exemplary embodiment, switch-interface port 218.3 is an 10/100 Ethernet port. In the exemplary embodiment, this exchange occurs under the control of a switch management Application Program Interface (API) that is part of interface software 216. One example of a suitable commercially available API is from QLogic Corporation of Aliso Viejo, Calif. Ports 218.1, 218.2, and 218.3 are coupled respectively to FC interface ports 221.1 and 221.2 and interface port 224 of switch portion 220.

Switch portion 220, which in the exemplary embodiment incorporates commercially available technology and supports multiple protocols including IP and SCSI, additionally includes internal FC interface ports 221.1 and 221.2, an FC switch 222, external FC ports (or interfaces) 223, a management interface port 224, and a switch processor module 225.

FC interface ports 221.1 221.2 are coupled respectively to ports of 218.1 and 218.2 of the router-to-switch interface via copper traces on or within board 230 or internal optical fiber links, thereby forming internal FC links. (In the exemplary embodiment, each external FC interface supports auto-negotiation as either an F or FL port, and the internal FC interfaces are fixed as either an F or FL port.)

FC switch 222, in the exemplary embodiment, incorporates a SANbox2-16 FC switch from QLogic Corporation. This SANbox2 switch includes QLogic's Itasca switch ASIC (application-specific integrated circuit). Among other things, this switch supports Extended Link Service (ELS) frames that contain manufacturer information. FC switch 222 also includes one or more sets of switch configuration data 222.1, which are subject to modification not only via commands from "storage-side" components, such as FC servers, hosts, and controllers, but also via commands from "router-side" components, such as a management station, command-line interface, or graphical user interface. Various embodiments may store these sets of switch configuration data in any convenient storage location, including for example, in one of the target storage devices or in a volatile or non-volatile memory anywhere on switch portion 220.

FC ports 223.1-223.8, which adhere to one or more FC standards or other desirable communications protocols, can be connected as point-to-point links, in a loop or to a switch. For flow control, the exemplary embodiment implements a FC standard that uses a look-ahead, sliding-window scheme, which provides a guaranteed delivery capability. In this scheme, the ports output data in sets of operatively related frames called sequences, with each frame having a header, a checksum, and a maximum length, such as 2148 bytes.

Moreover, the FC ports are auto-discovering and self-configuring and provide 2-Gbps full-duplex, auto-detection for compatibility with 1-Gbps devices. For each external FC port, the exemplary embodiment also supports: Aribtated Loop (AL) Fairness; Interface enable/disable; Linkspeed settable to 1 Gbps, 2 Gbps, or Auto; Multi-Frame Sequence bundling; Private (Translated) Loop mode.

Switch processor module 225 operates the FC switch and includes a switch processor (or controller) 225.1, and associated memory which includes a switch management agent 225.2. In the exemplary embodiment, switch processor 225.1 includes an Intel Pentium processor and a Linux operating system. Additionally, processor 225 has its own software image, initialization process, configuration commands, command-line interface, and graphical user interface (not shown). (In the exemplary embodiment, this command-line interface and graphical-user interface are not exposed to the end user.) A copy of the switch software image for the switch portion is maintained as a tar file 226 in bridge-and-buffer module 215 of router portion 210.

Exemplary Management Communications

The exemplary router-switch implements a communications method to make router portion 210 and switch portion 220 appear as an integrated device, particularly as viewed through management interface 213. To this end, software 216 includes an SNMP router-management agent and an MIB router handler (not shown). (SNMP denotes the Simple Network Management Protocol, and MIB denotes Management Information Base (MB)). The agent and handler cooperate with counterparts in switch portion 220 (also not shown) to provide integrated management and control of router and switching functions in router-switch 200.

Specifically, the exemplary embodiment implements or supports Fibre Alliance MIB 3.0, which entails loading MIB objects as separate modules, and adding them to a global MIB database that the SNMP router-management agent uses when resolving objects to a particular set of MIB handlers. In the exemplary embodiment, the SNMP router-management agent is based on the Wind River WindNet v1/v2c SNMP Agent code base, and an SNMP switch-management agent is based on the Linux UCD-SNMP code base.

Figure 3:
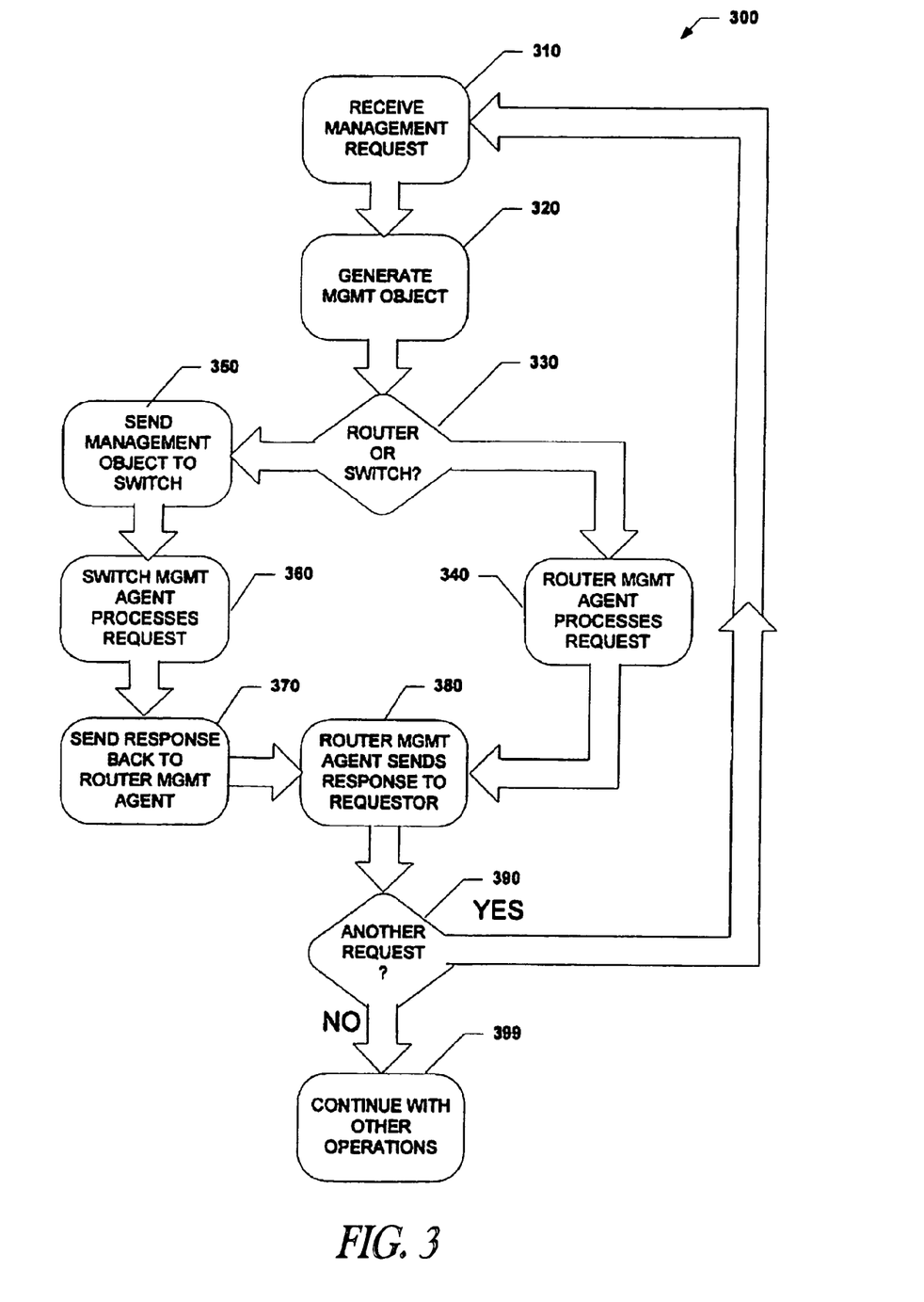
FIG. 3 is a flow chart corresponding to one or more embodiments of the present invention.

More specifically, FIG. 3 shows a flow chart 300 illustrating an exemplary method of using these agents and associated handlers. (The exemplary method is also applicable to management functions invoked via a graphical-user or command-line interface.) Flow chart 300 includes process blocks 310-399, which are arranged and executed in a particular order in the exemplary embodiment. However, other embodiments of the invention may reorder the execution of two or more blocks or portions thereof and/or execute two or more blocks or portions thereof in parallel. Moreover, the exemplary process flow applies to software, firmware, and hardware implementations.

Block 310 shows that the exemplary method begins with router-management agent AGT (in FIG. 2) receiving a management inquiry in the form of SNMP get or getNext request via management port 213 from an SNMP management station (not shown) connected to a management network (not shown). Execution continues at block 320.

In block 320, the router-management agent processes the management inquiry, which in the exemplary embodiment takes the form of an SNMP get or get-next request, by generating at least one SNMP management-request object.

In block 330, the router-management agent determines whether the management-request object relates to router or switch functions. If the object concerns router functions or can otherwise be fulfilled by the router-management agent, execution branches to block 340, which entails the router-management agent processing the request object, and then to block 380.

If, at block 330 the request object is determined to concern switch functions or otherwise cannot be fulfilled by the router-management agent, execution branches first to block 350 which entails mapping the request to a switch request and then sending the request object to the switch management agent, second to block 360 which entails the switch-management agent processing the request object, and third to block 370, which entails sending the response to the request back to the router-management agent. In some embodiments, the router-management agent, at block 360, may also perform other scheduled maintenance tasks, such as retrieve all or one or more portions of a set (or sets) of switch configuration data stored on the FC switch.

In the exemplary embodiment, the request object and its response are communicated between the router-management agent and the switch-management agent via the internal Ethernet link defined by ports 218.3 and 224. Also note that in the exemplary embodiment, the FC-management handler will try as many as three times to get a valid response from the switch-management agent, with a timeout of 0.3 seconds per request. If it does not get a valid response after three tries, an SNMP error signal is passed back to the router-management agent and ultimately onto the management station. Additionally, entries for non-user (internal) FC ports are filtered out from any responses passed back to the router-management agent.

The exemplary embodiment uses two data structures to facilitate communications between the FC-management handler and the switch-management agent. For each group of MIB objects, the exemplary embodiment maintains a branch information table, and for each object within a group, there also exists a leaf information object. The exemplary branch information data structure (FcSwSnmpBranchInfo) includes the following fields:

oidCount—specifies number of elements in oidList.
oidList—pointer to SNMP Object ID for group.
leafCount—specifies number of elements in leafInfo.
leafInfo—pointer to leaf information table for group.
preInstFilter—function pointer that allows filtering and adjustment on SNMP instance value before request is sent to FC Switch SNMP Agent.
postInstFilter—function pointer that allows filtering and adjustment on SNMP instance value after response is received from FC Switch SNMP Agent.
valueFilterLastmatch—specifies last component of SNMP object ID, used to return an additional object with request.
postValueFilter—function pointer that allows filtering based on an object value.
copyValue—function pointer that allows for overriding of an object value in response.

And, the exemplary leaf information data structure (FcSwSnmpLeafInfo) includes the following fields:

lastmatch—specifies last element of SNMP Object ID within group.
type—specifies SNMP object type.
requestLastmatch—specifies an optional value used to override lastmatch value.

The branch and leaf data structures allow the FC management module to handle the following:

Mapping of the port index from 1 through 8 on the Storage Router to actual FC Switch ports, while filtering non-user ports.
Filtering of entries from the connUnitLink table and connUnitSns table based on the value of an object within a particular entry.
The overriding of response values returned by the FC Switch SNMP Agent.
The ability to return a response value for an object that does not exist in a particular table, due to an error in the FC Switch SNMP Agent.

After execution of block 370 as well as block 340, exemplary execution continues with block 380. In block 380, the router-management agent, which may be regarded as a master management agent to the switch- or slave-management agent for the switch, sends the response back to the management station (or other requestor.) The exemplary embodiment sends the response back via management port 213. In some embodiments, the router-management agent may also perform scheduled or event-driven maintenance-related tasks, such as retrieving one or more portions of a source set (or sets) of switch configuration data stored on the switch.

Next, block 390 determines whether there are further requests to be answered. If there are additional requests, execution of the exemplary method branches back to block 310. And, if there are no additional requests execution branches to block 399, which generally represents any other operations.

Exemplary Operation of Synchronization Module

Figure 4:
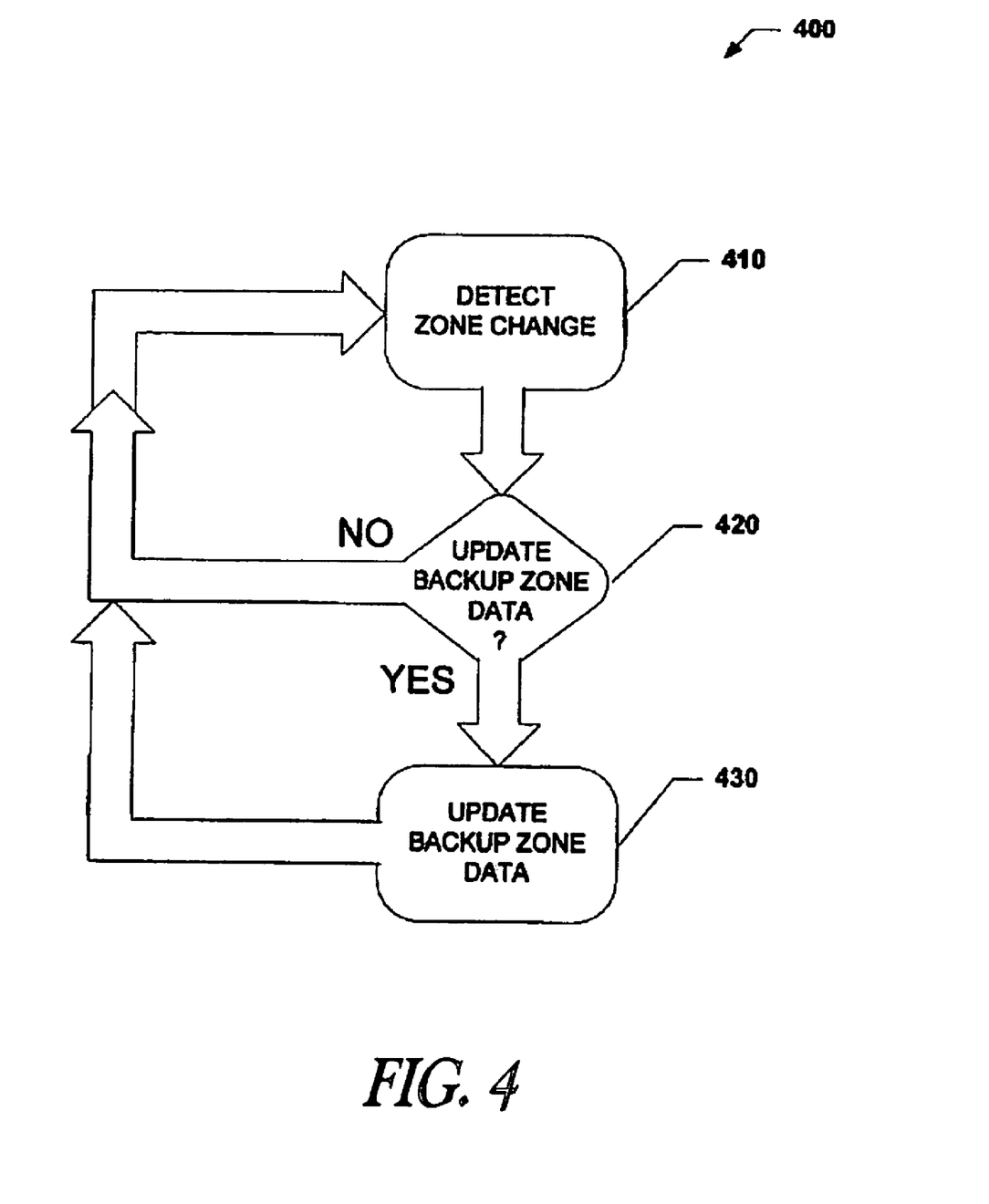
FIG. 4 is a flow chart showing an exemplary method of exemplary method of operating a synchronization module in accord with one or more embodiments of the present invention.

FIG. 4 shows a flowchart 400 illustrating an exemplary method of operating synchronization module 216.1 (in FIG. 2.) Flow chart 400 includes process blocks 410-430. Though these blocks (and those of other flowcharts in this document) are described serially in the exemplary embodiment, other embodiments may reorder the blocks, omit one or more blocks, combine two or more blocks, and/or execute two or more blocks in parallel using multiple devices, circuits, processors or a single processor organized as two or more virtual machines or subprocessors. Moreover, still other embodiments implement the blocks as one or more specific interconnected hardware or integrated-circuit modules with related control and data signals communicated between and through the modules.

The exemplary method begins at block 410, which entails detecting a zone change. In the exemplary embodiment, this detection occurs as a result of detecting receipt of a command to create or modify zone data, such as a zone, a zoneset, or an alias, and receiving acknowledgment that the command was successfully executed. (Note that commands that are successfully executed result in changes to the relevant portion of the zone configuration data on the FC switch; commands that fail result in transmission of a error message to the command sender.) A zone change can also be detected independently of any received zone-changing commands by comparing zone data stored on one or more FC switches (or in memories associated with FC switches) to a reference set of zone data, such as backup zone data 216.2. For example, some embodiments schedule regular comparisons of zone data (or portion thereof) to the backup zone data. Still other embodiments perform such comparisons based on a set of events, for example, receipt of zone merge commands. With detection of a zone change, exemplary execution advances to block 420.

Block 420 entails determining whether to update the backup zone data based on the detected change. In the exemplary embodiment, this determination entails determining whether the detected zone change was an authorized type of change and whether the change was made or initiated by an authorized changer. For example, some embodiments treat any zone changes made to FC switch 222 through use of the graphical user interface or command line interface for the router-switch as being authorized types of changes and as being by an authorized changer. In some embodiments, any changes to FC switch 222 made by or through one or more of ports 211.1, 211.2, 212, 213, and 214 are deemed to be authorized changes by an authorized changer. In still other embodiments, changers, such as other FC switches, acting through one or more of the FC ports on switch-router 200 are authorized to make one or more types of changes. For example, in one embodiment, another FC switch acting through one of FC ports 223 on switch-router 200 can clear the zone configuration for FC switch 222, which would in turn result in clearing of the backup zone data. However, other embodiments may be more or less restrictive in defining the sets of authorized changes and changers. For example, some embodiments consider changes made to the zone configuration data for other FC switches or components to be authorized changes.

If the update determination is negative, then execution branches back to block 410 to await detection of another zone change. However, if the update determination is affirmative, execution advances to block 430.

Block 430 updates the backup zone data. In the exemplary embodiment, this update entails updating the backup zone data by appending or overwriting a complete, date-stamped copy of the zone configuration data from FC switch 222 to any existing backup zone data. The copy may be in the form of a date-stamped file added to a backup zone directory structure. In some embodiments, this zone configuration data includes not only the zone configuration data for FC switch 222, but also the (or at least a version of the) zone-configuration data of other FC switches that may be coupled to FC switch 222.

However, other embodiments append a date-stamped copy of zone changes, which when applied to the previous backup zone data, yield complete zone data. This form of update creates a form of audit trail that facilitates restoration of the zone configuration to any previous state represented in the backup zone data.

Still other embodiments append both changes and a complete zone data set to any previous local backup zone data.

Update in some instances, such as one made in response to a clearing of zone configuration data on the switch, entails erasing or deleting the contents of the backup zone configuration. (If the clearing is the result of a command from one of a predetermined set of authorized changers, for example, a clear command issued through the graphical user interface or command line interface for the router-switch, then FC switch 222 will be isolated from the fabric.) (Note that the exemplary embodiment automatically creates an "iscsi" alias in the backup zone data if it contains no zone configuration data. Creation of the "iscsi" alias ensures that both internal Fibre Channel ports are added to a zone and that the IP side of the network does not become isolated from the Fibre Channel devices.) After update of the backup zone data, execution returns to block 410 to await detection of another zone change.

Figure 5:
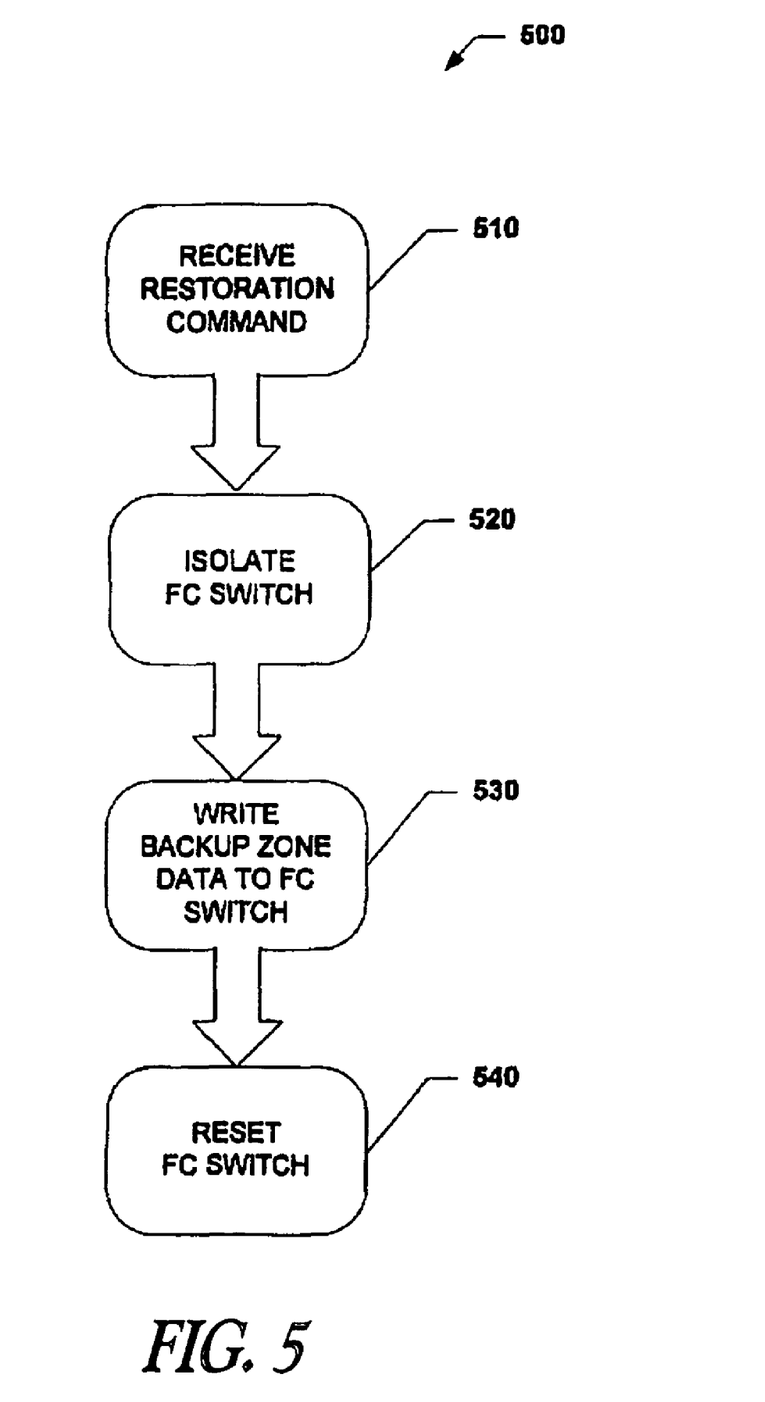
FIG. 5 is a flow chart showing an exemplary method of restoring a zone configuration I accord with one or more embodiments of the present invention.

FIG. 5 shows a flow chart 500 of an exemplary method of restoring a zone configuration of a FC switch, such as FC switch 222 in router-switch 200. Flow chart 500 includes process blocks 510-540.

The exemplary restoration method begins at block 510, which entails receipt of a restoration command. In the exemplary embodiment, this command is received from the command-line or graphical user interface on a management station, such as management station 114 in FIG. 1 and specifies a particular portion (such as a file) of the backup zone data to use as basis for the restoration. (The graphical- and command-line interfaces provide features for allowing an admininstrator to view the directory structure containing the backup zone data and thus facilitates selection or specification of the desired backup zone data). However, other embodiments may accept the command from other authorized changers. Execution continues at block 520.

Block 520 entails isolating the FC switch that is the target of the restoration. In the exemplary embodiment, this entails clearing the current zone configuration data on the FC, using a "clear FC zones" command, which results in isolation of the FC switch. Execution proceeds to block 530.

Block 530 entails writing entries from the backup zone data to the FC switch. In the exemplary embodiment, this entails writing the specified set of backup zone data to the FC switch and updating the backup zone data pursuant to the method outlined in FIG. 4. In some embodiments, for example, those that store differential backup zone data as opposed to complete backup zone data, several sets of differential data files may need to consolidated to form a Block 540 concludes the restoration process by resetting the FC ports on the FC switch and rejoining the switch to the switch fabric.

CONCLUSION

In furtherance of the art, the inventor has presented various exemplary systems, methods, and software related to creating, maintaining, and synchronizing backup zone configuration data for one or more components in a storage-area network.

The embodiments described above and in the following claims are intended only to illustrate and teach one or more ways of practicing or implementing the present invention, not to restrict its breadth or scope. The actual scope of the invention, which embraces all ways of practicing or implementing the teachings of the invention, is defined only by the following claims and their equivalents.

The invention claimed is:

1. A method of operating a storage-area network including at least one FC-compliant switch having a first zone configuration data set, the method comprising:
   detecting a change in a zone, an alias, or a zone set definition in the first zone configuration data set;
   updating a second zone configuration data set in response to detecting a change in the first zone configuration data set, the updating of the second zone configuration data set comprises:
   appending a complete and date-stamped copy of first zone configuration data from the first zone configuration data set to the second zone configuration data set, the second zone configuration data set being located in a memory device in a storage router coupled to the at least one FC-compliant switch
   determining whether the detected change in the first zone configuration data set was made by an authorized changer; and
   updating the second zone configuration data set if the determination is that the detected change was made by the authorized changer; and
   restoring the first zone configuration data set for the at least one FC-compliant switch from the second zone configuration data set, the restoration comprising isolating the at least one FC-compliant switch.

2. The method of claim 1, further comprising reconfiguring the FC-compliant switch based on contents of the second zone configuration data set.

3. The method of claim 1, wherein the storage router and the FC-compliant switch are mounted to a common circuit board.

4. The method of claim 1, wherein determining whether a detected change in the first zone configuration data set was made by an authorized changer, comprises: determining whether the detected change was initiated by a command from a user interface for the storage router coupled to the FC-compliant switch.

5. A non-transitory machine-readable medium comprising instructions for performing the method of claim 1.

6. The method of claim 1, wherein the isolating comprises clearing a current zone configuration data set from a memory device in the at least one FC-compliant switch.

7. Apparatus for a storage-area network, comprising:
   a non-transitory machine-readable medium carrying a set of coded instructions for:
   updating a first zone configuration data set in a first memory device in an iSCSI-compliant storage router in the network based on detection of changes made to a zone, an alias, or a zone set definition in a second zone configuration data set stored in a second memory device in an FC-compliant switch in the network, the updating of the first zone configuration data comprises:

appending a complete and date-stamped copy of second zone configuration data from the second zone configuration data set to the first zone configuration data set;

determining whether the detected changes were made by an authorized changer; and updating the first zone configuration data if the determination is that the detected changes were made by the authorized changer; and restoring the first zone configuration data set for the FC-compliant switch from the second zone configuration data set, the restoration comprising isolating the FC-compliant switch.

8. The apparatus of claim 7, wherein the iSCSI-compliant storage router includes the non-transitory machine-readable medium.

9. The apparatus of claim 7, further comprising: a common circuit board supporting the iSCSI-compliant storage router and the FC-compliant switch.

10. The apparatus of claim 7, wherein the iSCSI-compliant storage router includes a command-line interface module and a graphical-user interface module to allow saving the first zone configuration data set to the first memory device.

11. Apparatus for a storage-area network, comprising:
an IP port for receiving and outputting iSCSI-compliant input-output commands and associated data;
an FC port for receiving and outputting FC-compliant input-output commands and any associated data, based on the received iSCSI-compliant input-output commands and associated data;
an integrated router-switch coupled to the IP port and the FC port and including a router portion coupled to a switch portion through a router-to-switch interface;
the switch portion including a FC switch coupled between the router-to-switch interface and the FC port;
a first memory included in the FC switch for storing a first zone configuration data for the FC switch;
a second memory included in the router portion for storing a second zone configuration data for the FC switch;
a set of machine-readable instructions for:
updating the second zone configuration data based on a detection of changes made to a zone, an alias, or a zone set definition in the first zone configuration data, the updating of the second zone configuration data comprises:
appending a complete and date-stamped copy of the first zone configuration data to the second zone configuration data;
determining whether the detected changes were made by an authorized changer; and
updating the second zone configuration data if the determination is that the detected changes were made by the authorized changer; and
restoring the first zone configuration data for the FC switch from the second zone configuration data, the restoration comprising isolating the FC switch; and
a common circuit board supporting the IP port, the FC port, and the integrated router-switch including the router portion, the router-to-switch interface, and the switch portion including the FC switch.

12. The apparatus of claim 11, wherein the set of machine-readable instructions for updating the second zone data comprises instructions for:
detecting a change in the first zone configuration data;
determining whether the detected change in the first zone configuration data was made by an authorized changer; and
updating the second zone data if the determination is that the detected change was made by an authorized changer.

13. The apparatus of claim 12, wherein determining whether a detected change in the first zone configuration data was made by an authorized changer, comprises:
determining whether the detected change was initiated by a command from a user interface for the storage router coupled to the FC switch.

14. Apparatus for use in a storage-area network, comprising:
first means for receiving and outputting iSCSI-compliant input-output commands and associated data;
second means for selectively providing FC-compliant input-output commands and any associated data, based on the received iSCSI-compliant input-output commands and associated data, to a subset of two or more FC-compliant ports;
an FC switch coupled between the first means and the second means;
first memory means for storing first zone configuration data for the FC switch;
second memory means for storing second zone configuration data for the FC switch;
third memory means for updating the second zone configuration data based on a detection of changes made to a zone, an alias, or a zone set definition in the first zone configuration data, the third memory means for updating the second zone configuration data comprises:
appending a complete and date-stamped copy of the first zone configuration data to the second zone configuration data;
determining whether the detected changes were made by an authorized changer; and
updating the second zone configuration data if the determination is that the detected changes were made by the authorized changer;
fourth memory means for restoring the first zone configuration data for the FC switch from the second zone configuration data, the fourth memory means for the restoration further comprising means for isolating the FC switch; and
a common circuit board supporting the first and second means.

15. The apparatus of claim 14, further comprising a 1U rack-mountable enclosure enclosing the first and second means and the common circuit board.

16. A system comprising:
at least one iSCSI host computer; and
apparatus comprising:
an IP port for receiving and outputting iSCSI-compliant input-output commands and associated data from the iSCSI host computer;
an FC port for receiving and outputting FC-compliant input-output commands and any associated data, based on the received iSCSI-compliant input-output commands and associated data;
a FC switch coupled between the IP port and the FC port;
first memory means for storing first zone configuration data for the FC switch;
second memory means for storing second zone configuration data for the FC switch;
a set of machine-readable instructions for:
updating the second zone configuration data based on a detection of changes made to a zone, an alias, or a zone set definition in the first zone configuration data, the updating of the second zone configuration data comprises:

appending a complete and date-stamped copy of the first zone configuration data to the second zone configuration data;

determining whether the detected changes were made by an authorized changer; and updating the second zone configuration data if the determination is that the detected changes were made by the authorized changer; and restoring the first zone configuration data for the FC switch from the second zone configuration data, the restoration comprising isolating the FC switch;

a common circuit board supporting the IP port, the FC port, and the FC switch; and at least one target storage device coupled to the FC port.

17. A method comprising:

providing a FC switch having first zone configuration data stored in a memory device in the FC switch;

detecting a change in a zone, an alias, or a zone set definition in the first zone configuration data;

automatically updating a backup zone configuration data for the FC switch in a storage router external to the FC switch in response to the detecting the change in the first zone configuration data, the updating of the backup zone configuration data comprises:

appending a complete and data-stamped copy of the first zone configuration data to the backup zone configuration data;

determining whether the detected change in the first zone configuration data was made by an authorized changer; and updating the backup zone configuration data if the determination is that the detected change was made by the authorized changer; and restoring the first zone configuration data for the FC switch from the backup zone configuration data, the restoration comprising isolating the FC switch.

18. The method of claim 17, further comprising:

updating the first zone configuration data based on the backup zone configuration data.

19. The method of claim 17, wherein the storage router external to the FC switch comprises an iSCSI-compliant storage router.

20. The method of claim 19, wherein the FC switch and the iSCSI-compliant storage router are supported by a common circuit board.

* * * * *